US012040919B2

United States Patent
Kang et al.

(10) Patent No.: US 12,040,919 B2
(45) Date of Patent: *Jul. 16, 2024

(54) METHOD FOR TRANSMITTING SOUNDING REFERENCE SIGNAL IN WIRELESS COMMUNICATION SYSTEM AND DEVICE THEREFOR

(71) Applicant: LG ELECTRONICS INC., Seoul (KR)

(72) Inventors: Jiwon Kang, Seoul (KR); Jonghyun Park, Seoul (KR); Kilbom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,028

(22) Filed: Sep. 19, 2022

(65) Prior Publication Data

US 2023/0021451 A1     Jan. 26, 2023

Related U.S. Application Data

(63) Continuation of application No. 16/764,296, filed as application No. PCT/KR2018/014233 on Nov. 19, 2018, now Pat. No. 11,489,702.

(Continued)

(51) Int. Cl.
    *H04L 25/02*     (2006.01)
    *H04L 5/00*     (2006.01)
    (Continued)

(52) U.S. Cl.
    CPC ........ *H04L 25/0226* (2013.01); *H04L 5/0048* (2013.01); *H04W 8/24* (2013.01); *H04W 72/1263* (2013.01); *H04W 72/535* (2023.01)

(58) Field of Classification Search
    CPC .... H04L 5/0048; H04L 5/0053; H04L 5/0051
    See application file for complete search history.

(56) References Cited

U.S. PATENT DOCUMENTS

2011/0268028 A1    11/2011    Stern-Berkowitz et al.
2012/0252474 A1    10/2012    Tiirola et al.
(Continued)

FOREIGN PATENT DOCUMENTS

WO     2017003962 A1     1/2017

OTHER PUBLICATIONS

ZTE, Sanechips, Details of UL beam management, R1-1717430, 3GPP TSG RAN WG1 Meeting 90bis Prague, CZ, Oct. 9-13, 2017.
(Continued)

*Primary Examiner* — Romani Ohri
(74) *Attorney, Agent, or Firm* — BRYAN CAVE LEIGHTON PAISNER LLP

(57) ABSTRACT

The present specification provides a method for transmitting a sounding reference signal (SRS) in a wireless communication system. More particularly, a method for transmitting, by a terminal, a sounding reference signal (SRS) in a wireless communication system comprises: receiving, from a base station, information relating to a plurality of SRS resource sets, the SRS resource sets each comprising one or more SRS resources; and transmitting, to the base station, an SRS on the plurality of SRS resources based on the information, wherein, if the plurality of SRS resources are included in difference SRS resource sets, the SRS is transmitted simultaneously on the plurality of SRS resources.

10 Claims, 9 Drawing Sheets

Related U.S. Application Data

(60) Provisional application No. 62/590,357, filed on Nov. 23, 2017, provisional application No. 62/587,550, filed on Nov. 17, 2017.

(51) Int. Cl.
*H04W 8/24* (2009.01)
*H04W 72/1263* (2023.01)
*H04W 72/50* (2023.01)

(56) References Cited

U.S. PATENT DOCUMENTS

| | | | | |
|---|---|---|---|---|
| 2013/0170466 | A1* | 7/2013 | Nishio | H04L 5/0053 370/329 |
| 2015/0009951 | A1* | 1/2015 | Josiam | H04L 25/0224 370/330 |
| 2017/0230967 | A1* | 8/2017 | Jitsukawa | H04L 5/0094 |
| 2017/0264409 | A1* | 9/2017 | Guo | H04B 7/0413 |
| 2018/0041259 | A1* | 2/2018 | Kim | H04L 25/0204 |
| 2019/0297639 | A1* | 9/2019 | Wang | H04W 72/23 |
| 2019/0372805 | A1 | 12/2019 | Tang | H04L 25/0226 |
| 2020/0205082 | A1* | 6/2020 | Chen | H04L 5/0094 |
| 2020/0287751 | A1* | 9/2020 | Lee | H04L 5/0091 |
| 2020/0343950 | A1* | 10/2020 | Zhu | H04B 7/0617 |
| 2021/0135922 | A1* | 5/2021 | Gao | H04L 27/2607 |
| 2021/0160025 | A1* | 5/2021 | Gao | H04L 27/2613 |

OTHER PUBLICATIONS

LG Electronics, On SRS design and related operations, R1-1717948, 3G99 TSG RAN WG1 Meeting NR #90bis Prague, Czech Republic, Oct. 9-13, 2017.

* cited by examiner

[Fig. 1]
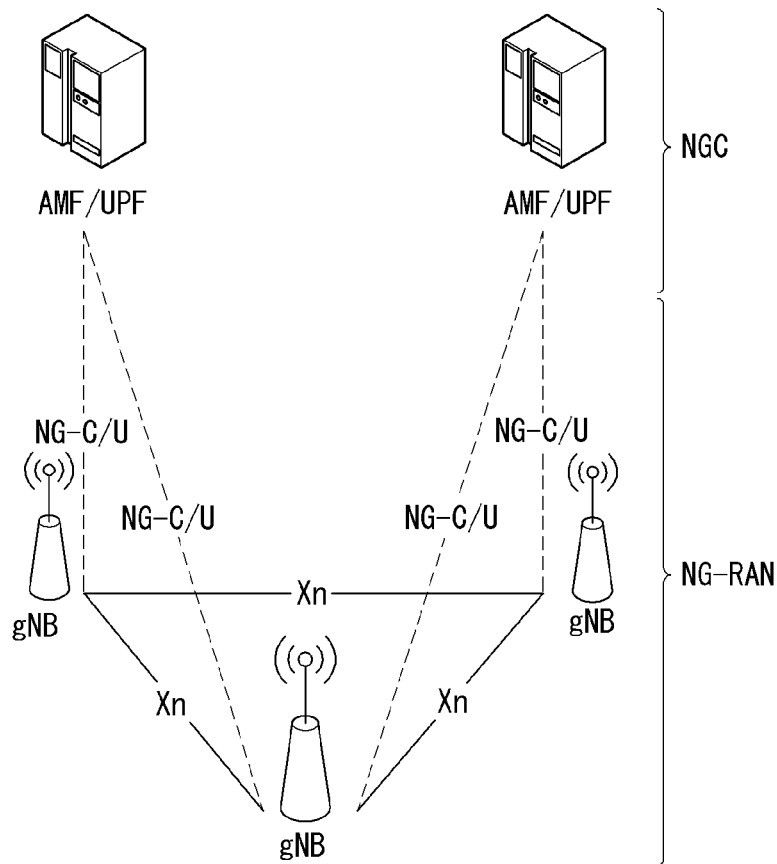
[Fig. 2]
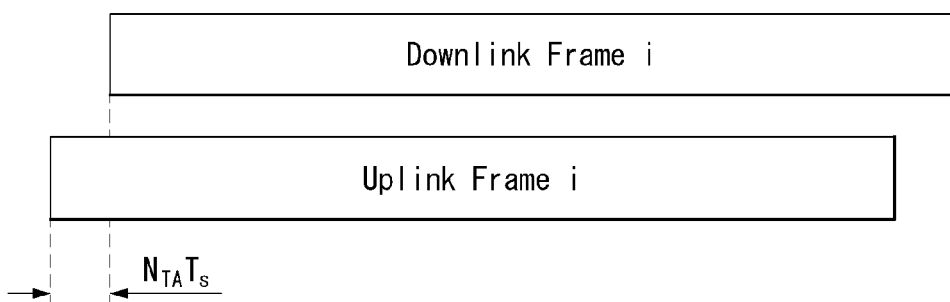

[Fig. 3]
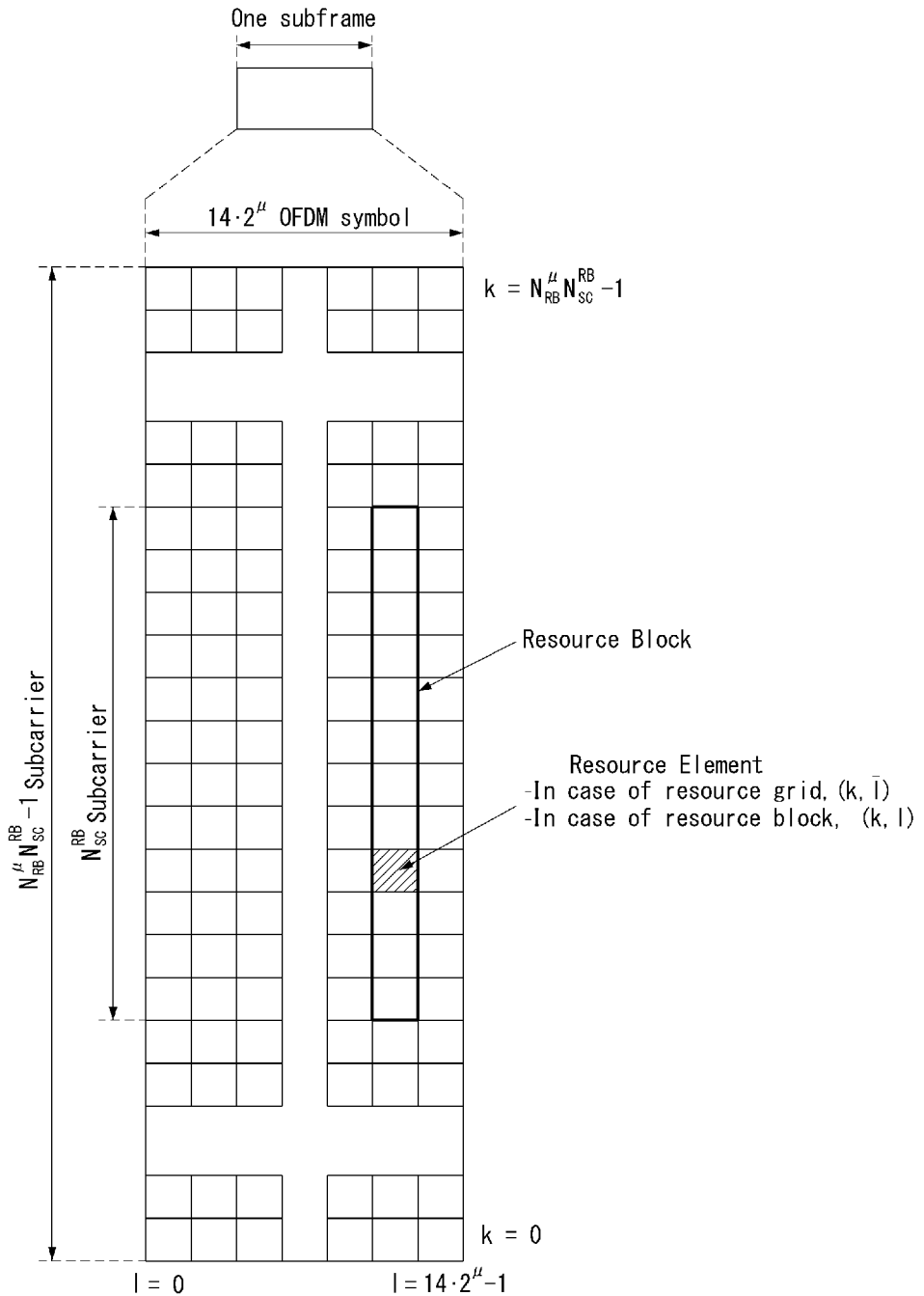

[Fig. 4]
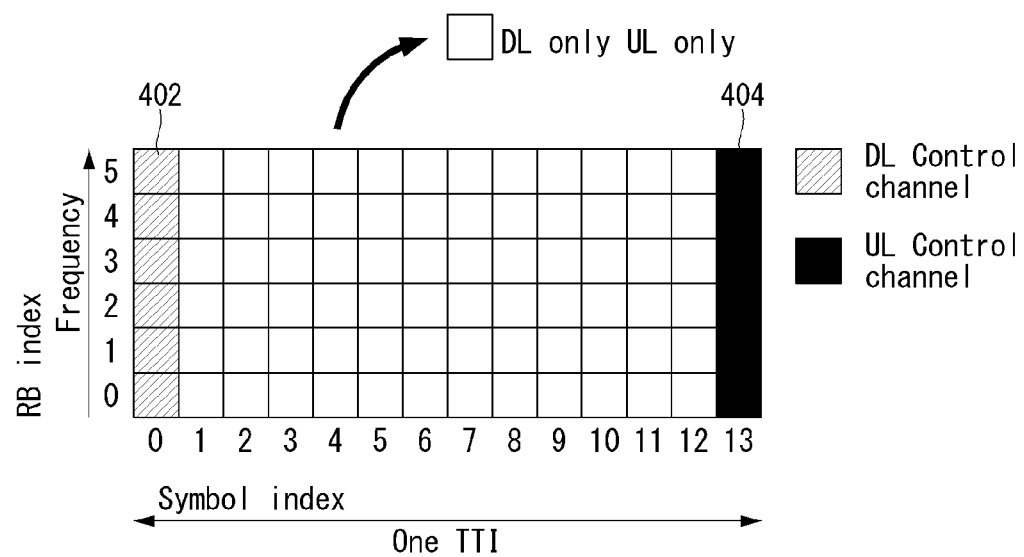

[Fig. 5]
(a)
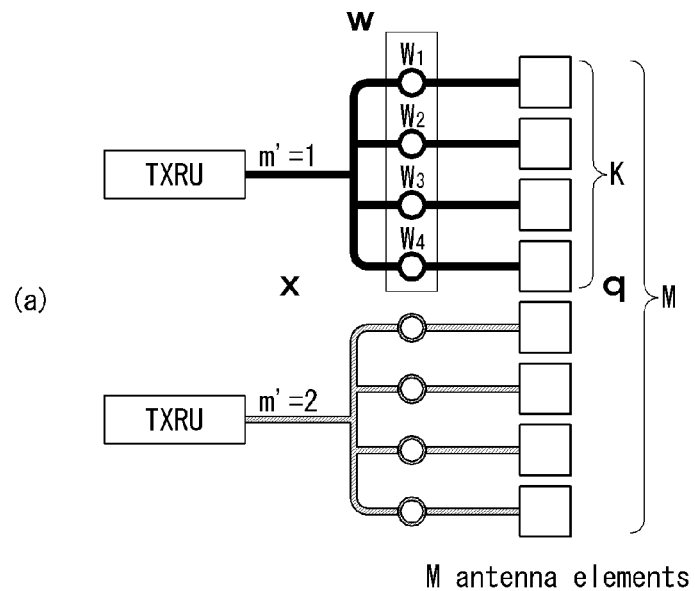
M antenna elements
(b)
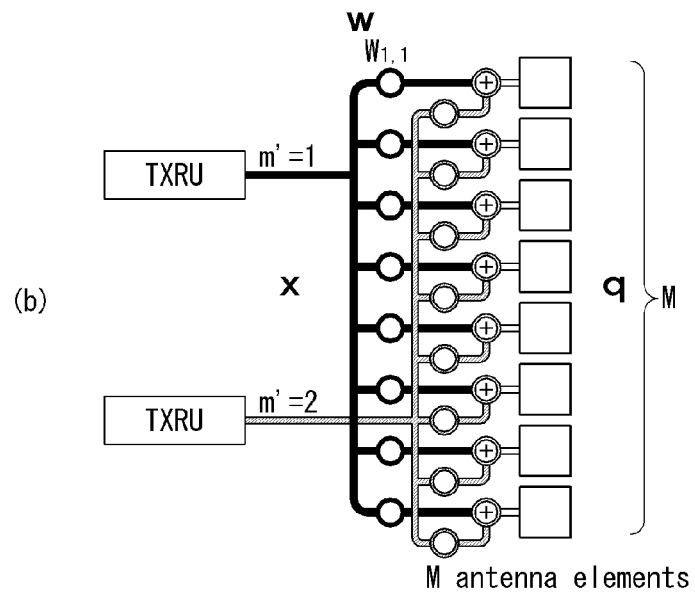
M antenna elements

[Fig. 6]
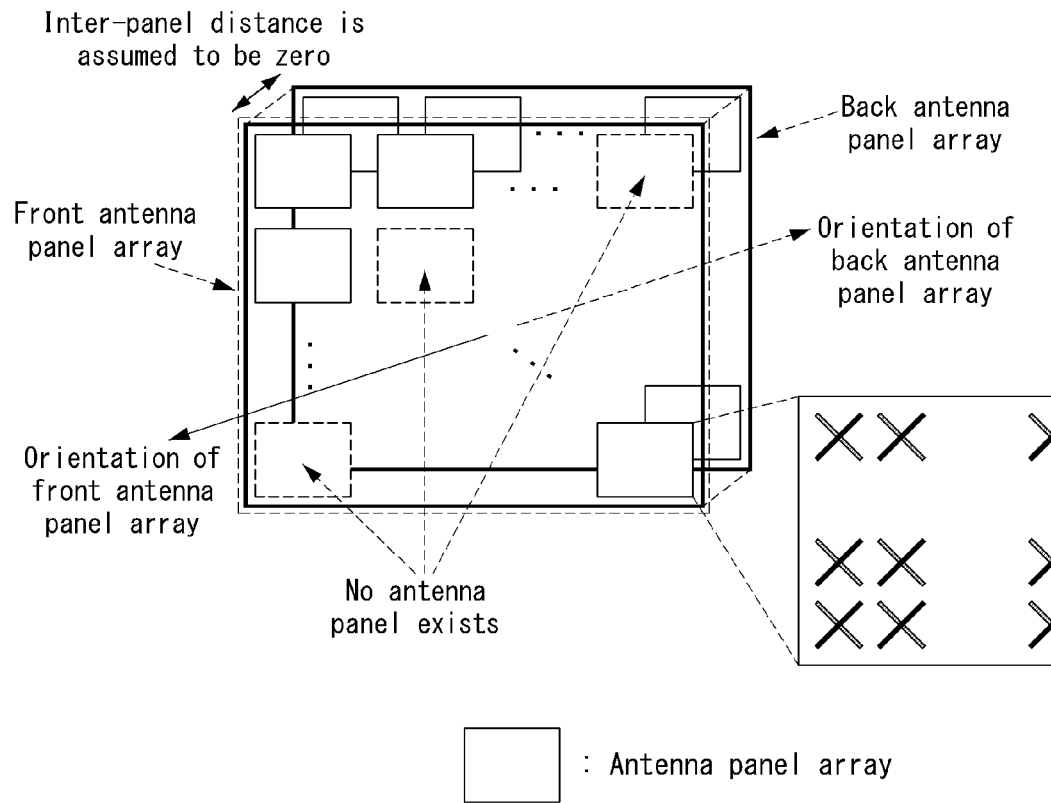
[Fig. 7]
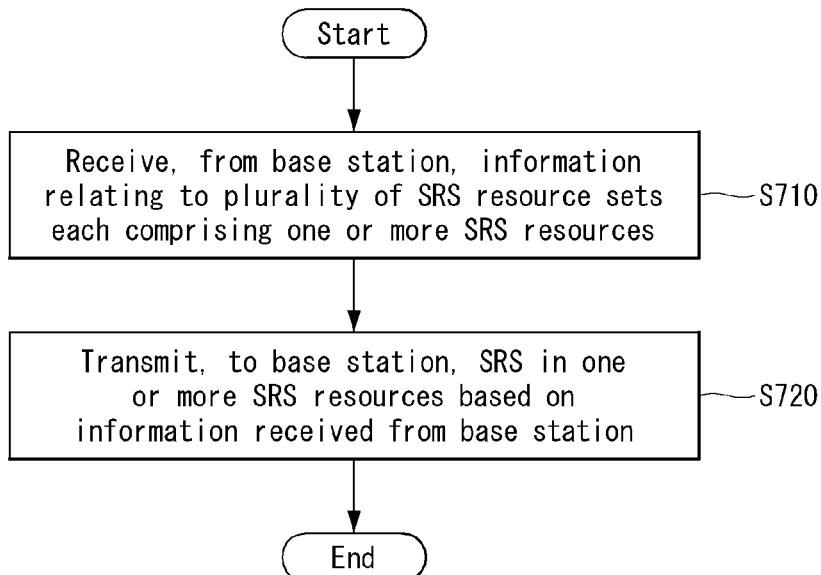

【Fig. 8】
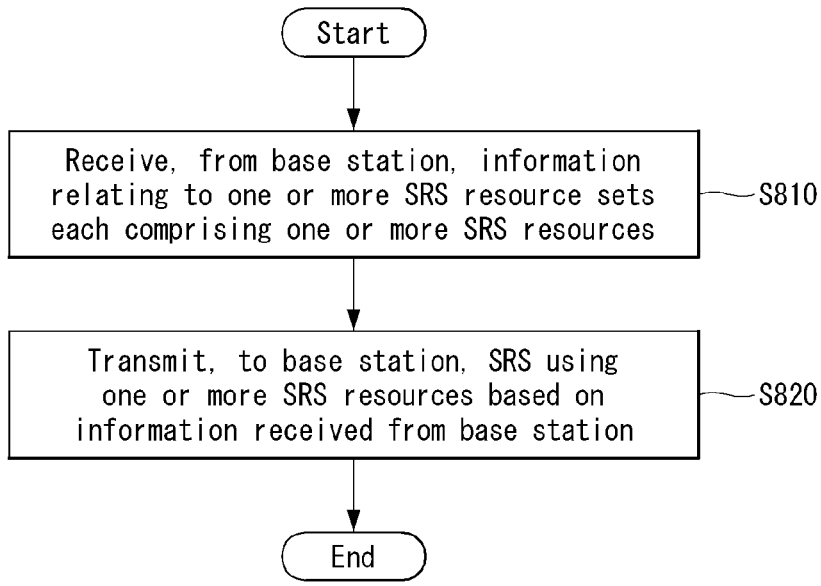
【Fig. 9】
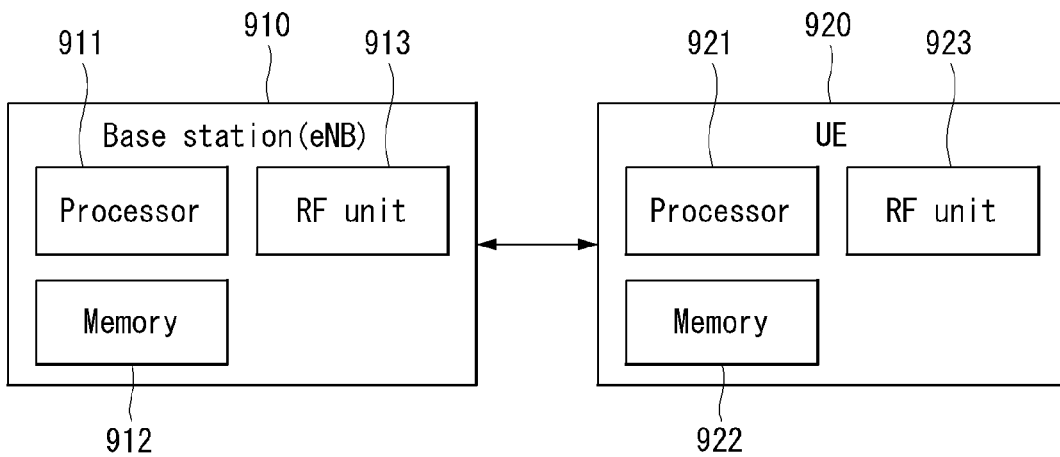

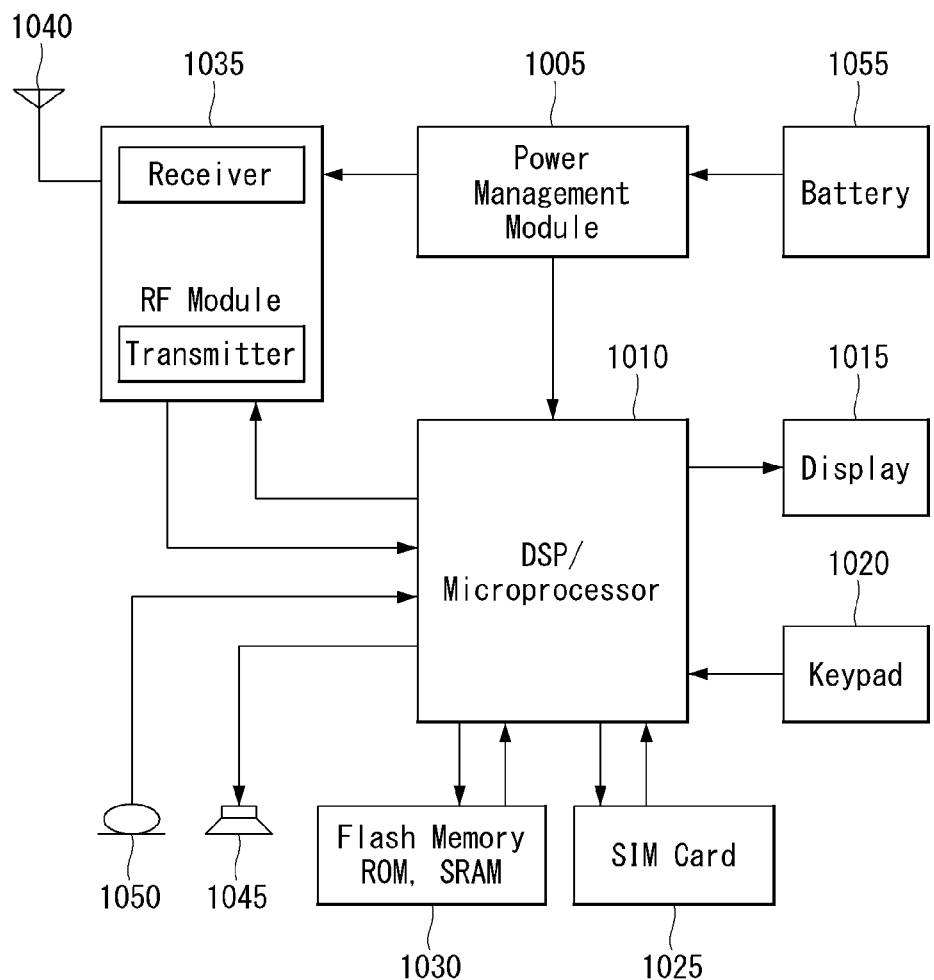
[Fig. 10]

METHOD FOR TRANSMITTING SOUNDING REFERENCE SIGNAL IN WIRELESS COMMUNICATION SYSTEM AND DEVICE THEREFOR

CROSS-REFERENCE TO RELATED APPLICATIONS

This application is a Continuation Application of U.S. patent application Ser. No. 16/764,296, filed on May 14, 2020, which is the National Stage filing under 35 U.S.C. 371 of International Application No. PCT/KR2018/014233, filed on Nov. 19, 2018, which claims the benefit of U.S. Provisional Application No. 62/587,550, filed on Nov. 17, 2017 and U.S. Provisional Application No. 62/590,357, filed on Nov. 23, 2017, the contents of which are all hereby incorporated by reference herein in their entirety.

TECHNICAL FIELD

The present disclosure relates to a wireless communication system and, more particularly, to a method for transmitting a sounding reference signal and a device supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

The present disclosure provides a method for transmitting a sounding reference signal (SRS).

Furthermore, the present disclosure proposes mapping between SRS sets and a phase-tracking reference signal (PT-RS) port.

Furthermore, the present disclosure proposes mapping between SRS sets, a PT-RS port, and dedicated demodulation reference signal (DM-RS) port groups.

Technical problems to be solved by the present disclosure are not limited to the above-mentioned technical problems, and other technical problems not mentioned herein may be clearly understood by those skilled in the art from description below.

Technical Solution

The present disclosure provides a method for transmitting an SRS in a wireless communication system.

Concretely, a method for transmitting, by a terminal, a sounding reference signal (SRS) in a wireless communication system comprises: receiving, from a base station, information relating to a plurality of SRS resource sets, the SRS resource sets each comprising one or more SRS resources; and transmitting, to the base station, an SRS on the plurality of SRS resources based on the information, wherein, if the plurality of SRS resources are included in difference SRS resource sets, the SRS is transmitted simultaneously on the plurality of SRS resources.

Furthermore, in the present disclosure, the method may further comprise transmitting, to the base station, capability information comprising information relating to SRS resource sets supported by the terminal.

Furthermore, in the present disclosure, the capability information may comprise at least one among the number of SRS resource sets, the number of SRS resources required for each SRS resource set, and the number of SRS resources in each SRS resource set that can be simultaneously transmitted.

Furthermore, in the present disclosure, if the plurality of SRS resources are included in different SRS resource sets, the SRS may be transmitted through frequency division multiplexing (FDM).

Furthermore, in the present disclosure, if the plurality of SRS resources are included in the same SRS resource set, the SRS may be transmitted through time division multiplexing (TDM).

Furthermore, in the present disclosure, the information relating to SRS resource sets transmitted by the terminal and the information relating to SRS resource sets received from the base station may be mapped according to a preset rule.

Furthermore, the present disclosure provides a method for transmitting, by a terminal, a sounding reference signal (SRS) in a wireless communication system, the method comprising: receiving, from a base station, information relating to a plurality of SRS resource sets, the SRS resource sets each comprising one or more SRS resources; and transmitting, to the base station, an SRS on the plurality of SRS resources based on the information, wherein, if the plurality of SRS resource sets share a specific phase-tracking reference signal (PT-RS) port, associated dedicated demodulation reference signal (DM-RS) port groups are concatenated to the specific PT-RS port.

Furthermore, in the present disclosure, the method may further comprise transmitting, to the base station, UE capability information comprising a mapping relationship between SRS resource sets and a PT-RS port.

Furthermore, in the present disclosure, in the mapping relationship, one or more SRS resource sets included in the same SRS resource set may be mapped to the same PT-RS port.

Furthermore, in the present disclosure, the information received from the base station may comprise information on the index of the PT-RS port mapped to the plurality of SRS resource sets.

Furthermore, in the present disclosure, the transmitting of the SRS to the base station may comprise transmitting the SRS to the base station based on the PT-RS port index information.

Furthermore, the present disclosure provides a terminal that performs transmission of a sounding reference signal (SRS) in a wireless communication system, the terminal comprising: a radio frequency (RF) module for transmitting and receiving a radio signal; and a processor functionally connected to the RF module, wherein the processor is configured to: receive, from a base station, information relating to a plurality of SRS resource sets, the SRS resource sets each comprising one or more SRS resources; and transmit, to the base station, an SRS on the plurality of SRS resources based on the information, wherein, if the plurality of SRS resources are included in difference SRS resource sets, the SRS is transmitted simultaneously on the plurality of SRS resources.

Furthermore, in the present disclosure, the processor may be configured to transmit, to the base station, capability information comprising information relating to SRS resource sets supported by the terminal.

Furthermore, in the present disclosure, the capability information may comprise at least one among the number of SRS resource sets, the number of SRS resources required for each SRS resource set, and the number of SRS resources in each SRS resource set that can be simultaneously transmitted.

Furthermore, in the present disclosure, if the plurality of SRS resources are included in different SRS resource sets, the SRS may be transmitted through frequency division multiplexing (FDM).

Furthermore, in the present disclosure, if the plurality of SRS resources are included in the same SRS resource set, the SRS may be transmitted through time division multiplexing (TDM).

Furthermore, in the present disclosure, the information relating to SRS resource sets transmitted by the terminal and the information relating to SRS resource sets received from the base station may be mapped according to a preset rule Advantageous Effects The present disclosure allows for simultaneous transmission of SRS on SRS resources in different SRS resource sets.

Furthermore, the present disclosure allows DMRS ports in the same group to be mapped to one PT-RS port.

The effects of the present disclosure are not limited to the above-mentioned effects, and other effects not mentioned above can be clearly understood by one skilled in the art from the following description.

DESCRIPTION OF DRAWINGS

The accompanying drawings, included as part of the detailed description in order to help understanding of the present disclosure, provide embodiments of the present disclosure and describe the technical characteristics of the present disclosure along with the detailed description.

FIG. 1 is a diagram illustrating an example of an overall structure of a new radio (NR) system to which a method proposed by the present disclosure may be implemented.

FIG. 2 illustrates a relationship between a UL frame and a DL frame in a wireless communication system to which a method proposed by the present disclosure may be implemented.

FIG. 3 illustrates an example of a resource grid supported in a wireless communication system to which a method proposed by the present disclosure may be implemented.

FIG. 4 is a diagram illustrating an example of a self-contained subframe structure in a wireless communication system to which the present disclosure may be implemented.

FIG. 5 is an example of a transceiver unit model in a wireless communication system to which the present disclosure may be implemented.

FIG. 6 is a diagram illustrating an example in which a plurality of antenna panel arrays are mounted within a terminal proposed in the present disclosure.

FIG. 7 is a flowchart illustrating an example of a terminal's operation for transmitting an SRS proposed in the present disclosure.

FIG. 8 is a flowchart illustrating another example of a terminal's operation for transmitting an SRS proposed in the present disclosure.

FIG. 9 illustrates a block diagram of a wireless communication device to which methods proposed in the present disclosure may be applied.

FIG. 10 illustrates a block diagram of a communication device according to an exemplary embodiment of the present disclosure.

MODE FOR INVENTION

Figure 11:
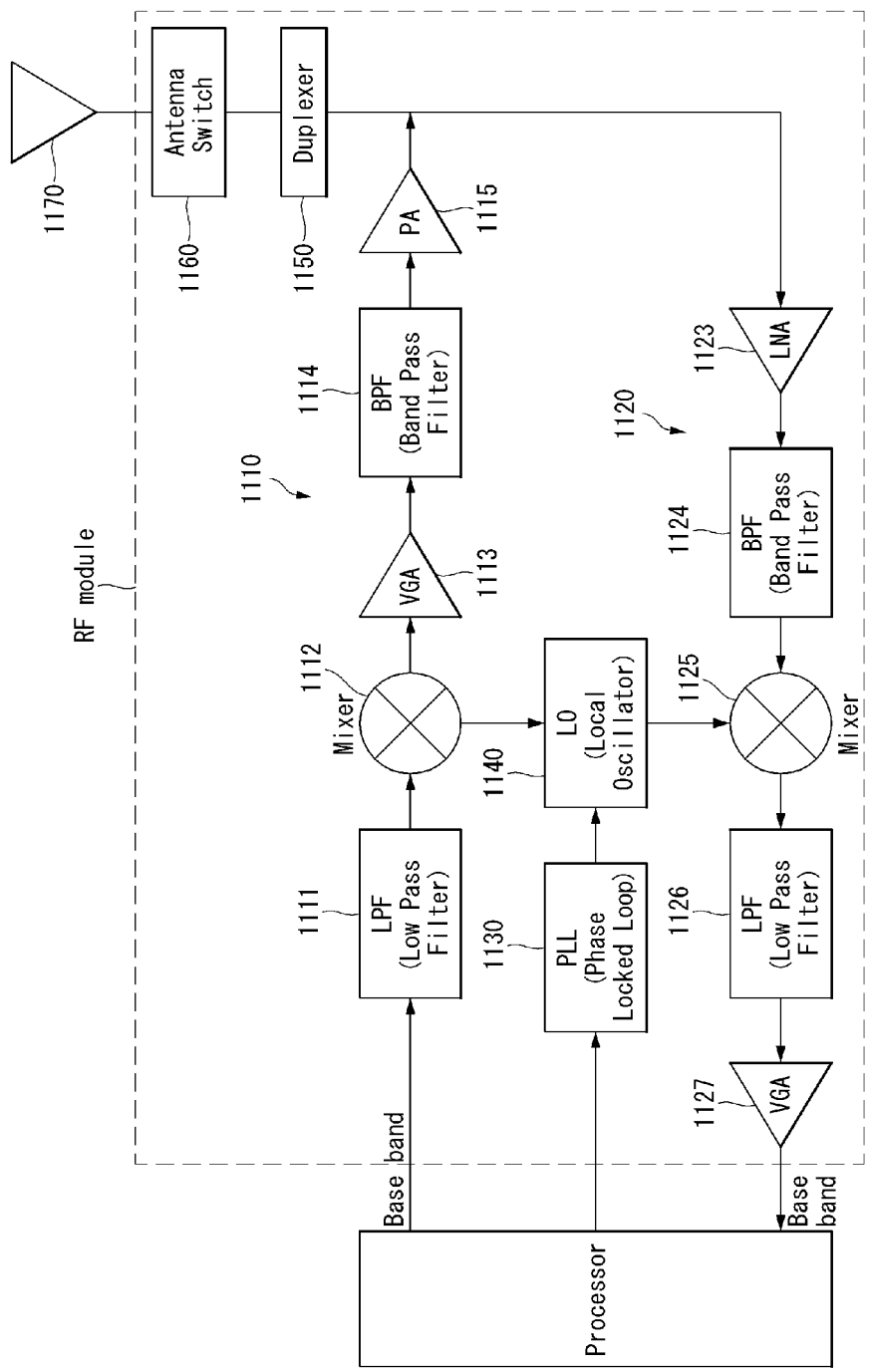
FIG. 11 is a diagram illustrating an example of an RF module of a wireless communication device to which a method proposed in the present disclosure may be applied.

In what follows, preferred embodiments of the present disclosure will be described in detail with reference to appended drawings. Detailed descriptions to be disclosed below with reference to the appended drawings are intended to describe illustrative embodiments of the present disclosure but are not intended to represent the sole embodiment of the present disclosure. Detailed descriptions below include specific details to provide complete understanding of the present disclosure. However, it should be understood by those skilled in the art that the present disclosure may be embodied without the specific details to be introduced.

In some cases, to avoid obscuring the gist of the present disclosure, well-known structures and devices may be omitted or may be depicted in the form of a block diagram with respect to core functions of each structure and device.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) may be replaced with a term such as fixed station, Node B, evolved-NodeB (eNB), Base Transceiver System (BTS), Access Point (AP), or general NB (gNB). Also, a terminal can be fixed or mobile; and the term may be replaced with a term such as User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

Specific terms used in the following descriptions are introduced to help understanding the present disclosure, and the specific terms may be used in different ways as long as it does not leave the technical scope of the present disclosure.

The technology described below may be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA may be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA may be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

The embodiments of the present disclosure may be supported by standard documents disclosed for at least one of wireless access systems such as the IEEE 802, 3GPP, and 3GPP2. In other words, those steps or portions among embodiments of the present disclosure not described to clearly illustrate the technical principles of the present disclosure may be backed up by the aforementioned documents. Also, all of the terms disclosed in the present document may be described by the aforementioned standard documents.

For the purpose of clarity, descriptions are given mainly with respect to the 3GPP LTE/LTE-A, but the technical features of the present disclosure are not limited to the specific system.

DEFINITION OF TERMS eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface
General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.
The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure
In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or $\mu$). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology $\mu$, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | | Slot configuration | | | | |
|---|---|---|---|---|---|---|
| | | 0 | | | 1 | |
| μ | $N_{symb}^\mu$ | $N_{frame}^{slots, \mu}$ | $N_{subframe}^{slots, \mu}$ | $N_{symb}^\mu$ | $N_{frame}^{slots, \mu}$ | $N_{subframe}^{slots, \mu}$ |
| 0 | 14 | 10  | 1  | 7 | 20 | 2 |
| 1 | 14 | 20  | 2  | 7 | 40 | 4 |
| 2 | 14 | 40  | 4  | 7 | 80 | 8 |
| 3 | 14 | 80  | 8  | — | —  | — |
| 4 | 14 | 160 | 16 | — | —  | — |
| 5 | 14 | 320 | 32 | — | —  | — |

TABLE 3

| | | Slot configuration | | | | |
|---|---|---|---|---|---|---|
| | | 0 | | | 1 | |
| μ | $N_{symb}^\mu$ | $N_{frame}^{slots, \mu}$ | $N_{subframe}^{slots, \mu}$ | $N_{symb}^\mu$ | $N_{frame}^{slots, \mu}$ | $N_{subframe}^{slots, \mu}$ |
| 0 | 12 | 10  | 1  | 6 | 20 | 2 |
| 1 | 12 | 20  | 2  | 6 | 40 | 4 |
| 2 | 12 | 40  | 4  | 6 | 80 | 8 |
| 3 | 12 | 80  | 8  | — | —  | — |
| 4 | 12 | 160 | 16 | — | —  | — |
| 5 | 12 | 320 | 32 | — | —  | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 3 illustrates an example of a resource grid supported in a wireless communication system to which a method proposed by the present disclosure may be implemented.

Referring to FIG. 3, a resource grid is composed of $N_{RB}^\mu N_{sc}^{RB}$ subcarriers in a frequency domain, each subframe composed of $14 \cdot 2^\mu$ OFDM symbols, but the present disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols Herein, $N_{RB}^\mu \le N_{RB}^{max,\mu}$. The above $N_{RB}^{max,\mu}$ indicates the maximum transmission bandwidth, and it may change not just between numerologies, but between UL and DL.

In this case, as illustrated in FIG. 3, one resource grid may be configured for the numerology μ and an antenna port p.

Each element of the resource grid for the numerology μ and the antenna port p is indicated as a resource element, and may be uniquely identified by an index pair (k,l̄). Herein, $k=0, \ldots, N_{RB}^\mu N_{sc}^{RB}-1$ is an index in the frequency domain, and $\bar{l}=0, \ldots, 2^\mu N_{symb}^{(\mu)}-1$ indicates a location of a symbol in a subframe. To indicate a resource element in a slot, the index pair (k,l) is used. Herein, $l=0, \ldots, N_{symb}^\mu-1$.

The resource element (k,l̄) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^\mu-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \qquad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^\mu-1$ in the frequency region.

Self-Contained Subframe Structure

A time division duplexing (TDD) structure considered in an NR system is a structure in which both uplink (UL) and downlink (DL) are processed in one subframe. This is for minimizing latency of data transmission in the TDD system, and the structure is called a self-contained subframe structure.

FIG. 4 is a diagram illustrating an example of a self-contained subframe structure in a wireless communication system to which the present disclosure may be implemented. FIG. 2 is only for convenience of description and does not limit the scope of the present disclosure.

Referring to FIG. 4, as in the case of legacy LTE, a case where one subframe includes 14 orthogonal frequency division multiplexing (OFDM) symbols is assumed.

In FIG. 4, region 402 denotes a downlink control region, and region 404 denotes an uplink control region. In addition, regions other than the region 402 and the region 404 (that is, regions without a separate indication) may be used for transmission of downlink data or uplink data.

That is, uplink control information and downlink control information are transmitted in one self-contained subframe. On the other hand, in the case of data, uplink data or downlink data is transmitted in one self-contained subframe.

When using the structure shown in FIG. 4, within one self-contained subframe, downlink transmission and uplink transmission may proceed sequentially, and transmission of downlink data and reception of uplink ACK/NACK may be performed.

As a result, when an error in data transmission occurs, the time required for retransmission of data can be reduced. In this way, delays associated with data delivery can be minimized.

In the self-contained subframe structure shown in FIG. 4, a time gap is required for a base station (eNodeB, eNB, gNB) and/or terminal (user equipment (UE)) to switches from a transmission mode to a reception mode or to switch from the reception mode to the transmission mode. A time gap is required for the process or the process of switching from the reception mode to the transmission mode. In relation to the time gap, when uplink transmission is performed after downlink transmission in the self-contained subframe, some OFDM symbol(s) may be set as a guard period (GP).

Analog Beamforming

In a millimeter wave (mmW) range, as the wavelength of the signal becomes shorter, multiple (or multiplex) antennas may be installed in the same area. For example, in a 30 GHz band, the wavelength is approximately 1 cm, and when antennas are installed at an interval of 0.5 lambda (wavelength $\lambda$) on a 5 cm×5 cm panel in a two-dimensional arrangement, a total of 100 antenna elements may be installed.

Therefore, in the mmW range, the coverage may be enhanced or a throughput may be increased by increasing a beamforming (BF) gain with a plurality of antenna elements.

In this case, in order to enable adjusting transmission power and phase for each antenna element, if a transceiver unit (TXRU) is included, independent beamforming for each frequency resource is possible.

However, it is not cost-efficient to install TXRU at each of about 100 antenna elements.

Thus, a method is considered in which a plurality of antenna elements is mapped to one TXRU and a direction of beam is adjusted with an analog phase shifter.

Such analog BF method is able to make only one beam direction over the entire frequency band, and there is a disadvantage that frequency-selective BF is not allowed.

A hybrid BF may be considered which is an intermediate between digital BF and analog BF, and which has B number of TXRU less than Q number of antenna elements.

In this case, although varying depending upon a method of connecting B number of TXRU and Q number of antenna elements, beam directions capable of being transmitted at the same time is restricted to be less than B.

Hereinafter, typical examples of a method of connecting TXRU and antenna elements will be described with reference to drawings.

FIG. 5 is an example of a transceiver unit model in a wireless communication system to which the present disclosure may be implemented.

A TXRU virtualization model represents a relationship between output signals from TXRUs and output signals from antenna elements. Depending on a relationship between antenna elements and TXRUs, the TXRU virtualization model may be classified as a TXRU virtualization model option-1: sub-array partition model, as shown in FIG. 5(a), or as a TXRU virtualization model option-2: full-connection model, as shown in FIG. 5(b).

Referring to FIG. 5(a), in the sub-array partition model, the antenna elements are divided into multiple antenna element groups, and each TXRU may be connected to one of the multiple antenna element groups. In this case, the antenna elements are connected to only one TXRU.

Referring to FIG. 5(b), in the full-connection model, signals from multiple TXRUs are combined and transmitted to a single antenna element (or arrangement of antenna elements). That is, this shows a method in which a TXRU is connected to all antenna elements. In this case, the antenna elements are connected to all the TXRUs.

In FIG. 5, q represents a transmitted signal vector of antenna elements having M number of co-polarized in one column. W represents a wideband TXRU virtualization weight vector, and W represents a phase vector to be multiplied by an analog phase shifter. That is, a direction of analog beamforming is decided by W. x represents a signal vector of M_TXRU number of TXRUs.

Herein, mapping of the antenna ports and TXRUs may be performed on the basis of 1-to-1 or 1-to-many.

TXRU-to-element mapping In FIG. 5 is merely an example, and the present disclosure is not limited thereto and may be equivalently applied even to mapping of TXRUs and antenna elements which can be implemented in a variety of hardware forms.

Cellular systems are now evolving from the 4th generation (4G) to the 5th generation (5G).

In the use of 5G communication, various internet-of-things (IoT) application services such as healthcare, disaster safety, vehicle communication, factory control, robot control, etc., as well as a progression (enhanced mobile broadband (eMBB)) from the existing smartphone-based mobile broadband services, are being considered.

Thus, terminal types are also diversifying.

In fifth-generation communications, the utilization of extremely high frequency bands including millimeter wave bands up to 100 GHz is being considered.

According to such various terminal implementation forms and utilization of extremely high frequency bands, unlike the 4G system, the number of antennas to which a terminal may be mounted may also consider tens to hundreds of antennas.

In an example, a vehicle may be one terminal, and thus, a plurality of antennas may be distributed and installed in one or several vehicle positions.

In another example, as shown in FIG. 6, a plurality of antenna panel arrays may be installed in a terminal, mainly in a high-frequency band.

Here, although a plurality of antenna elements are distributed at uniform intervals in an antenna panel array, antenna orientation or intervals may not be uniform among the panel arrays.

When the plurality of antenna arrays/panels are mounted with different directivity (or coverage) in the terminal as in the above-described embodiments, it is difficult to apply a codebook designed assuming a standardized precoding scheme like uniform linear/rectangular array, as in the existing uplink (UL) MIMO systems.

In addition, if the distance between the plurality of mounted antenna arrays/panels and the baseband processor differs, a fixed phase difference may occur due to a delay difference.

This may generate differences in temporal synchronization between signals transmitted by different antenna units. This means that, from the receiving base station's point of view, the phase of signal transmitted by a particular terminal antenna group may be distorted linearly in proportion to the subcarriers (assuming an OFDM system and a delay difference within CP).

Furthermore, when signals transmitted from each antenna panel array/panel use different oscillators, the signals may be transmitted at slightly different frequencies due to oscillator errors.

This may cause a frequency synchronization error in the base station.

Accordingly, noise increase due to magnitude reduction, phase distortion, and ICI of the signals transmitted in a specific antenna group may occur from the base station's point of view.

The above-described problem of magnitude/phase distortion between UE's transmit antenna groups may vary in severity depending on UE implementation.

For example, the UE may solve the above cabling issue in practice by implementing a separate procedure for compensating for the delay difference for each antenna group, and the oscillator issue also may be solved in practice by using a single oscillator or by introducing a separate frequency compensation procedure.

However, this compensation process may require a separate processor or RF circuit, thereby increasing the complexity and cost of UE implementation.

As described above, the 5th generation terminal includes a high-end terminal with a high-cost processor for obtaining high quality data and a low-cost IoT terminal as described above, it is desirable to support various levels of distortion.

Accordingly, the present disclosure proposes an uplink multi-antenna transmission technique adaptive to inter-APG (antenna port group) distortion vulnerability level which varies per terminal, and a related signaling procedure.

For convenience of description, distortion vulnerability level is abbreviated as "DVL".

Moreover, "/" used in the present disclosure may be construed as "and/or", and "A and/or b" may be construed as having the same meaning as "comprise at least either A or B.

Also, the terms "set/set up/configure" used in the present disclosure may be construed as having the same meaning as "indicate" or "define".

(Proposal 1)

Proposal 1 proposes that UE reports the following information to the base station.

The information is divided into two cases, which are as follows:

Case1[non-precoded SRS]: Port grouping information about uplink reference signal(RS) ports Case2[beamformed SRS]: Number of uplink antenna arrays/panels/groups, RS port grouping information, or maximum RS ports per RS port group In Case2, the base station, upon receiving the information, may indicate port grouping information in the process of performing the configuration of uplink RS transmission on the corresponding UE.

In addition, the UE may report DVL information between port groups to the base station.

Hereinafter, for convenience of description, uplink RS will be described with respect to sounding RS (SRS).

The SRS port grouping information is information that explicitly or implicitly indicates how many port groups a total of M SRSs are made into and how many SRS ports each port group includes.

The port group information may correspond to the UE's antenna panel array configuration information or distributed antenna unit information.

An example of such information is as follows.

For example, the UE indicates the number $M_i$ (i=1, ..., N) of SRS ports belonging to each group (where N is the number of port groups).

For example, if M=5, $M_1$=3, $M_2$=2, and N=2, this may indicate that SRS port{0,1,2} belongs to the first group and SRS port{3,4} belongs to the second group.

In addition, the SRS port grouping information may be used to configure, determine, and indicate a UL MIMO precoder.

This will be described in detail with reference to Proposal 2 to be described later.

Also, the SRS port grouping information may be used to estimate/correct uplink synchronization.

For example, since each SRS port group may have different frequency/time synchronization characteristics, the base station may perform uplink synchronization correction only with respect to a specific SRS port group.

Moreover, the SRS port grouping information may be used to estimate uplink channels.

If the base station estimates channels with respect to all SRS ports in such an environment, an increase in delay spread due to cable delay at the antenna port group level and an increase in jitter due to different oscillator characteristics may be measured.

Thus, the base station may be required to perform measurements at the SRS port group level depending on the intended use and the channel parameter to be estimated.

Moreover, large scale fading (e.g., shadowing) may vary with each SRS port group, and quality values such as RSRP, RSRQ, and CQI may be used to make measurements per port group.

In addition, the base station may measure the phase/magnitude distortion for each uplink antenna array/panel/group or for each SRS port group and provide the UE with this information so that the UE performs pre-compensation and then transmits the information.

For example, the base station may measure a frequency-linear phase shift caused by a cable delay difference for each SRS port group and indicate the phase shift for each SRS port group to the UE.

(Proposal 1-1)

The base station uses the received RS port grouping information for at least one among uplink MIMO precoding configuration information, uplink synchronization estimation/correction, uplink channel estimation, and distortion compensation per SRS port group.

If the SRS port grouping information is used for distortion compensation per SRS port group, the base station may signal a magnitude/phase compensation value for each SRS port group to the UE.

As an example of the DVL information between SRS port groups in Proposal 1, the following three stages: HIGH, MEDIUM, LOW stages may be considered.

Upon receiving this information, if DVL=HIGH, the base station may interpret that the corresponding UE has severe phase distortion (e.g., a low-end UE). On the contrary, if DVL=LOW, the base station may interpret that the corresponding UE has almost no phase distortion.

Alternatively, depending on whether a meaningful magnitude/phase distortion has occurred or not, two stages: ON and OFF may be considered.

When the two-stage DVL information is considered, the base station may perform uplink channel estimation by using a plurality of antenna ports, similarly to quasi-co-location information between downlink antenna ports in a 3GPP LTE system.

In this case, the two-stage DVL information may be information indicating whether the same attenuation (e.g. shadowing), frequency (e.g., Doppler), and/or time (e.g., delay) characteristics may be assumed for some or all of channel estimation parameters.

That is, it may refer to quasi-col-location information between uplink SRS port groups.

Since the proposed DVL and/or SRS port grouping information is information about the UE's characteristics which does not change dynamically, it is more desirable to transmit the information through a higher layer (e.g., RRC layer) message.

(Proposal 2)

The base station may configure uplink MIMO precoder configuration information to be indicated to the UE as the following three types of information:

1) Partial precoder configuration information: PMI information [non-precoded SRS case] to be used per SRS port group or SRS port index(es) information [beamformed SRS case]

2) Magnitude/phase matching information between partial precoders (concatenating precoder information)

In this case, the presence or absence and size of the information may be differentiated according to the UE's DVL or the base station's indication.

The information may comprise whether or not the concatenating precoder is cycled and the range thereof (e.g., precoder set information).

A candidate concatenating precoding method may comprise transmit diversity or open loop precoding (e.g., large delay CDD precoder in LTE).

3) Information on the number of simultaneously transmitted layers (rank information): This is a common value indicated for all SRS ports.

In the method proposed in the present disclosure, precoder information to be used per SRS port group is basically indicated, but phase compensation information between groups is differentiated according to DVL.

When SRS ports are transmitted in their individual transmission RF chains as in the LTE system, that is, in the case of non-precoded SRS port transmission, MIMO precoder information to be used per SRS port group may contain an uplink PMI and RI (rank indicator) that will be used by the UE.

Beamforming may be applied to an SRS port—that is, one SRS port may be beamformed and transmitted to a specific precoder in a plurality of transmission RF chains.

In this case, the base station may indicate UE precoder information as SRX port index(es) information.

In the case of the beamformed SRS, the base station may take into consideration a method of transmitting individual SRS ports by applying beamforming for each UE antenna group in Proposal 1.

In the present disclosure, the base station indicates PMI or port selection information for each SRS port group so as to configure a partial precoder for each UE antenna group with different radio channel and hardware characteristics.

For RI information, only one value may be signaled because the same value has to be applied to all SRS port groups (common RI).

In the case of beamformed SRS, the RI information may be omitted because it may be implicitly signaled by the number of ports per SRS group.

The UE may acquire partial precoder information from the above information.

That is, the UE may acquire information on the partial precoding matrix $w_i'$ with a size of $M_i \times r$ (i=1, ..., N, and r=transmission rank).

To determine the precoding matrix W with a size of M×r for all antennas ($M = \Sigma_{i=1}^{N} M_i$), the UE should perform a process for concatenating individual partial precoding matrices. In this process, the UE requires information for correcting magnitude and phase differences between the partial precoding matrices.

Let the magnitude correction value for the jth layer of the ith partial precoder be $a_{i,j}$ and the phase correction value be $\theta_{i,j}$, then, the corrected partial precoding matrix $W_i$ may be given by the following Equation 2.

$$W_i = \begin{bmatrix} a_{i,1} e^{j\theta_{i,1}} w_{i,1} & \ldots & a_{i,RI} e^{j\theta_{i,RI}} w_{i,RI} \end{bmatrix}, \quad \text{[Equation 2]}$$

where NW indicated precoder $W_i' = [w_{i,1} \ldots w_{i,RI}]$

From this, the final precoding matrix may be given as follows:

$$W = \begin{bmatrix} W_1 \\ \vdots \\ W_N \end{bmatrix} \quad \text{[Equation 3]}$$

The magnitude/phase compensation between partial precoders is required, just like concatenating PMI(CPMI) information is required in downlink for cooperative transmission between a plurality of base stations.

The magnitude compensation information may be indicated by the base station if each antenna group has different pathloss and shadowing characteristics, and it may be omitted if these characteristics are similar.

The magnitude/phase compensation information may be differentiated according to DVL.

For example, in the case of a UE with good DVL, precise magnitude/phase compensation information may be sent so that the UE may perform accurate matching between partial precoding matrices, and, in the case of a UE with poor DVL, coarse compensation information may be sent, or the corresponding information may be dropped.

The following is an example of differentiating downlink control information according to DVL.

Below, DCI case 1 corresponds to non-precoded SRS transmission, and DCI case 2 corresponds to beamformed SRS transmission.

If UE reported DVL=HIGH,

DCI case 1: Uplink PMI per each SRS port group+RI

DCI case 2: SRS port index(es) per each SRS port group (+RI)

RI can be implicitly determined by the number of SRS ports and excluded in the feedback information.

If UE reported DVL=MID,

DCI case 1: Uplink PMI per each SRS port group+RI+U bit resolution phase information($\theta_{i,j}'$, i=1, . . . , N−1, j=1, . . . , RI) for concatenation of port groups DCI case 2: SRS port index(es) per each SRS port group (+RI)+U bit resolution phase information($\theta_{i,j'}$, i=1, . . . , N−1, j=1, . . . , RI) for concatenation of port groups RI can be implicitly determined by the number of SRS ports and excluded in the feedback information.

If UE reported DVL=LOW,

DCI case 1: Uplink PMI per each SRS port group+RI+V bit resolution phase information($\theta_{i,j'}$, i=1, . . . , N−1, j=1, . . . , RI) for concatenation of port groups V can be greater than or equal to U.

In this case, Uplink PMI for all SRS ports can be an alternative to the above information.

DCI case 2: SRS port index(es) per each SRS port group (+RI)+V bit resolution phase information($\theta_{i,j'}$, i=1, . . . , N−1, j=1, . . . , RI) for concatenation of port groups V can be greater than or equal to U.

In this case, SRS port index(es) for all SRS port group (+RI) can be an alternative to the above information.

RI can be implicitly determined by the number of SRS ports and excluded in the feedback information.

When the above-described method is applied, a UE with high DVL may have a problem that the phase compensation information is absent or insufficient.

However, such information may be unnecessary because it is highly likely that phase distortion may occur due to the hardware characteristics.

Such a UE may perform transmission in such a way that it generates a plurality of concatenating precoders and use them alternately at agreed intervals of time/frequency resource.

A detailed method for this will be described in Proposal 3 below.

When such a method (hereinafter, referred to as concatenating precoder cycling) is applied, the base station may include information needed for the UE to apply this technique in signaling.

For example, the signaling may comprise information such as whether cycling is done or not, the range of phase/magnitude for cycling, and concatenating precoder set information.

(Proposal 3) [Semi-Open Loop UL MIMO Precoding]

If a UE has a DVL equal to or less than a specific level or is instructed by the base station to apply the following methods, the UE configures the MIMO precoder to be applied to uplink transmission as follows.

Partial precoder: It is determined based on information (downlink control information) indicated by the base station.

Concatenating precoder: It is determined by the following two methods.

Method 1: The UE may select a random concatenating precoder at given intervals of time/frequency resource or use a pre-agreed concatenating precoder through higher layer signaling or as a standard.

Method 2: The UE may generate a plurality of concatenating precoder sets based on concatenating precoder information, which is generated from information (downlink control information) indicated by the base station, and then alternately use the precoder sets at given intervals of time/frequency resource.

The following is an example to which Proposal 3 is applied when the three-stage DVL is applied.

If the UE reports DVL=HIGH to the base station, Method 1 is applied.

In this case, a different concatenating precoder is applied for each given time/frequency resource.

$\theta_{i,j}(k)$, which is an (i,j)-th value for concatenating a precoder for k-th time/frequency resource, may be equal to $D_{i,j}(k)$.

$D_{i,j}(k)$ is a random value selected by the UE or a value pre-agreed through higher layer signaling or as a standard.

For example, the angle of (360*natural number) may be divided by the number of resources depending on the number of allocated frequency resources, and then constantly increased depending on the resource index.

Alternatively, the angle of (360*natural number) may be divided by the number of resources depending on the size of allocated frequency resources, and then $D_{i,j}(k)$ may be determined according to a specific interleaving pattern.

If the UE reports DVL=MID to the base station, Method 2 is applied.

In this case, a different concatenating precoder is applied for each given time/frequency resource.

$\theta_{i,j}(k) = E_{i,j}(k) +$ value ($\theta_{i,j}'$) indicated by DCI $E_{i,j}(k)$ is a random value selected by the UE or a value pre-agreed through higher layer signaling or as a standard, which has a value within a specific angle range.

For example, the angle X (X«180) may be divided by the number of resources depending on the number of allocated frequency resources and then constantly increased according to the resource index.

Alternatively, the angle X (X«180) may be divided by the number of resources depending on the size of allocated frequency resources, and then $D_{i,j}(k)$ may be determined according to a specific interleaving pattern.

If the UE reports DVL=LOW to the base station, a common concatenating precoder is applied for all time/frequency resources.

In this case, $\theta_{i,j}(k)$=value indicated by DCI ($\theta_{i,j}'$)

When the proposed method is applied, the number of layers to be simultaneously transmitted is determined with reference to a global precoder obtained by combining partial precoders. In addition, not only a method for transmitting as many demodulation RS (DM-RS) ports as the number of layers but also a method for mapping different partial precoders to different uplink demodulation RS ports may be taken into consideration.

That is, the UE may transmit a DM-RS port(s) using the partial precoder for each antenna group indicated by the base station, and apply open-loop precoding such as a transmit diversity scheme to the corresponding ports in data channels such as PUSCH and PUCCH.

This is like applying open-loop precoding using a plurality of cell-specific RS ports in a 3GPP LTE system.

However, the difference is that each RS port uses beamforming specified by the base station for each antenna group.

As an example of the above method, if the UE has a total of two antenna groups in the case of rank 1 transmission, a total of two DM-RS ports are transmitted respectively to the antenna groups, and the Alamouti-scheme-based transmit diversity scheme is applied between the two ports. In this case, which scheme will be applied should be agreed between the base station and the UE so that the base station assumes the corresponding scheme to modulate data.

Hereinafter, non-CB(codebook)-based UL MIMO transmission will be outlined briefly prior to discussing an SRS grouping-based reporting and configuration method proposed in the present disclosure with reference to Proposals 4 to 6 to be described later.

Only wideband SRI is supported in Release15 for non-CB(codebook)-based UL transmission.

In this case, support is provided to indicate DL measurement RS in order for the UE to calculate UL candidate precoders for precoded AP(aperiodic)-SRS resources via downlink control information (DCI).

Here, the DL measurement RS is a CSI-RS for CSI acquisition.

Also, the DCI signal may use the same field as the one used for AP-SRS resource triggering.

Moreover, the triggered state, triggered SRS resources, and CSI-RS resource ID may be configured via higher layer (signaling).

In addition, the DL measurement RS may be indicated in order for the UE to calculate UL candidate precoders for precoded P(periodic)/SP-SRS(semi-persistent) resource via higher layer signaling.

In this case, the DL measurement RS may be a CSI-RS for CSI acquisition.

In addition, P(>1)-port AP-CSI-RS and SP-SRS may be associated with each other.

In this case, AP-CSI-RS can be transmitted in the same slot as the DCI containing AP-SRS trigger.

Also, the AP-SRS(s) is transmitted in X symbols after AP-CSI-RS.

In addition, the UL precoder calculation time based on the associated CSI-RS may be determined by the UE.

In addition, when the UE is configured with multiple SRS resource sets, one of the following three methods may apply:

Method 1: Only one resource in each of multiple SRS sets can be transmitted at a given time.

The SRS resources in different SRS resource sets (for a subset of the configured SRS resource sets) can be transmitted simultaneously.

Method 2: All resources in one of the UE's SRS resource sets can be transmitted simultaneously.

In this case, the SRS resources in different SRS resource sets can be transmitted simultaneously or not.

Method 3: All resources in a subset of one of the UE's SRS resource sets can be transmitted simultaneously.

In this case, the SRS resources in different SRS resource sets (for a subset of the configured SRS resource sets) can be transmitted simultaneously.

In this case, the UE may inform gNB of the number of resource sets supported by the UE and the number of supported SRS resources.

In addition, the UE may inform of the number of supported SRS resources that can be transmitted simultaneously per SRS resource set.

Meanwhile, the three proposals, i.e., Proposals 4 through 6 to be described below, refer to the UE's operations for transmitting SRS in SRS resources configured in relation to a number of SRS resource sets.

In the present disclosure, two pieces of the most important information about the UE include the number of UE panels (hereinafter, first information) and the maximum number of simultaneously transmittable beams for each UE panel (or the number of TXRUs, hereinafter, second information).

Here, the number of panels referred to herein may denote the number of SRS resource sets.

In this case, the first information is important to address different UE implementations, and is related to the UE's coherency capability.

Some UEs may have perfect calibration capability across different panels but some UEs do not.

For UEs having non-ideal calibration capability across different panels, the UEs should not be requested to do coherent transmission using UL antenna ports from multiple panels.

In this case, it should be noted that UE can still be requested to do coherent transmission using UL antenna ports from the same panel.

In addition, the second information is needed for gNB to know how many SRS resources can be FDMed.

For example, if UE has two panels and the maximum number of simultaneously transmittable beams per panel is four, gNB can configure up to 8 FDMed SRS resources to the UE.

In other words, gNB should not configure more than 8 FDMed SRS resources to the UE.

The information is also important to determine maximum UL rank for codebook based and non-codebook based operations.

In this regard, we propose that each SRS resource set should refer to each UE panel and UE reports the number of supported SRS resources that can be transmitted simultaneously per (SRS resource) set to gNB.

In addition, gNB can utilize this information for many purposes including codebook based, non-codebook based operations, and UL beam management.

Next, an SRS grouping-based reporting and configuration method proposed in the present disclosure will be described in detail with reference to Proposals 4 to 6.

(Proposal 4)

Proposal 4 relates to supporting the following UE capability information.

The Supported Number of SRS Resource Sets

The number of SRS resource sets corresponds to the number of panels

The Supported Number of SRS Resources that can be Transmitted Simultaneously Per Set The number of SRS resources corresponds to the number of FDMed beams/ports per panel Port Coherency Capability Across Different SRS Resource Sets The exact number of beams a UE can produce would also be needed for UL beam management purpose for gNB to know how many SRS resources and symbols would be required for U-1/U-2/U-3 procedures, but the information may not be necessary for non-codebook based operation because non-codebook based operation would be done based on full/partial reciprocity of the wireless channel.

Especially for partially reciprocal environment (i.e. long-term reciprocity holds but short-term reciprocity does not), UE can try different beamforming for different SRS transmission based on estimated DL channel and the number of trials can be indicated by gNB.

In other words, the required number of trials would not necessarily be reported to the network.

For example, for non-codebook based operation, the exact number of SRS resources per set does not need to be reported.

As described, gNB can configure multiple SRS resource sets to a UE.

In this case, UE transmits multiple FDMed and/or TDMed SRS resources within a set from the same panel.

UE can assume that the index set configured by gNB is mapped to the index set reported by UE capability.

(Proposal 5)

When UE is configured with multiple SRS resource sets, UE can assume that the set indices configured by gNB are mapped to the set indices reported by UE capability.

(Proposal 6)

A subset of or all resources in one of a UE's SRS resource sets can be transmitted simultaneously.

The SRS resources in different SRS resource sets (for a subset of the configured SRS resource sets) can be transmitted simultaneously That is, the base station may perform SRS grouping(set)-based SRS configuration depending on the SRS resource grouping information reported by UE (the number of SRS resource groups, the maximum number of SRS resources required (per group), the number of simultaneously transmittable SRS resources (per group)).

In this case, there is a need to make an agreement with the base station about how configured SRS resource (or port) groups are recognized for operation.

As proposed in the present disclosure, the UE transmits the SRS resources in the same SRS resource group from the same panel.

In other words, it can be said that the SRS resources in an SRS resource group belong to one SRS resource group the UE has reported to the base station by its capability.

In addition, although the SRS resource group index reported by the UE and the SRS resource group index set by the base station may match each other or not, they may be in a one-to-one relationship. That is, the base station may set N SRS resource groups as i_1, i_2, . . . i_N, and, if the UE reports M SRS resource groups as j_1, j_2, . . . j_M, the UE may assume that the i_n-th resource group (n=1, . . . , N) is mapped (corresponds) to at least one of j_1, j_2, . . . j_M even if N and M are not equal.

In this case, the number of resources in a mapped (corresponding) resource group may not be the same. Although such a mapping relationship may be assumed by the UE (by a certain relationship or by a set rule), a method for the base station to explicitly set up/indicate the mapping relationship for clear indication may be suggested.

Examples of the set rule may involve judging whether the condition (e.g., the number of resources set by the base station is equal to or less than the maximum number reported by the UE) is met or not, by comparing the maximum number of beams per group reported by the UE and/or the maximum number of simultaneously transmittable per group with the actually set number of SRS resources in a group and/or the maximum number of FDMed resources among the SRS resources in a group.

If there are a plurality of groups that meet this condition, the UE may specify a certain group and transmit it, or may select one and transmit it by a specific rule (e.g., lowest group(set) index).

By the mapping between DMRS port groups and a PT-RS port, the DMRS ports in the same group may use the same PT-RS port even if the PT-RS port indicates a specific DMRS port.

Hereinafter, a method for transmitting a sounding reference signal (SRS) proposed in the present disclosure will be described in detail with reference to FIGS. 7 and 8.

FIG. 7 is a flowchart illustrating an example of a process performed by a terminal, in a method for transmitting an SRS proposed in the present disclosure.

First of all, a UE receives, from a base station, information relating to a plurality of SRS resource sets each comprising one or more SRS resources (S710).

To put the step S710 differently, the UE receives, from the base station, information relating to a plurality of SRS resource sets.

Here, the SRS resource sets each may comprise one or more SRS resources.

Afterwards, the UE transmits, to the base station, the SRS on the one or more SRS resources based on the information received from the base station (S720).

In the step S720, the one or more SRS resources may be referred to as a plurality of SRS resources.

If the one or more SRS resources are referred to as a plurality of SRS resources in the step S720, "the one or more SRS resources" to be described below may be replaced altogether by the plurality of SRS resources.

In this case, the UE may transmit, to the base station, capability information comprising information relating to SRS resource sets supported by the UE.

The capability information may comprise at least one among the number of SRS resource sets, the number of SRS resources required for each SRS resource set, and the number of SRS resources in each SRS resource set that can be simultaneously transmitted.

If the plurality of SRS resources are included in different SRS resource sets, the SRS may be transmitted through frequency division multiplexing (FDM).

If the plurality of SRS resources are included in the same SRS resource set, the SRS may be transmitted through time division multiplexing (TDM).

The information relating to SRS resource sets transmitted by the UE and the information relating to SRS resource sets received from the base station may be mapped according to a preset rule.

FIG. 8 is a flowchart illustrating another example of a process performed by a terminal, in a method for transmitting an SRS proposed in the present disclosure.

First of all, a UE receives, from a base station, information relating to one or more SRS resource sets each comprising one or more SRS resources (S810).

To put the step S810 differently, the UE receives, from the base station, information relating to a plurality of SRS resource sets.

Here, the SRS resource sets each may comprise one or more SRS resources.

Afterwards, the UE transmits, to the base station, the SRS on the one or more SRS resources based on the information received from the base station (S820).

In the step S820, the one or more SRS resources may be referred to as a plurality of SRS resources.

If the one or more SRS resources are referred to as a plurality of SRS resources in the step S820, "the one or more SRS resources" to be described below may be replaced altogether by the plurality of SRS resources.

If the one or more SRS resource sets share a specific phase-tracking reference signal (PT-RS) port, associated dedicated demodulation reference signal (DM-RS) port groups may be concatenated to the specific PT-RS port.

In this case, the UE may transmit, to the base station, UE capability information comprising a mapping relationship between SRS resource sets and a PT-RS port.

In the mapping relationship, one or more SRS resource sets included in the same SRS resource set may be mapped to the same PT-RS port.

The information received from the base station may comprise information on the index of the PT-RS port mapped to the plurality of SRS resource sets.

The SRS may be transmitted to the base station based on the PT-RS port index information.

Furthermore, the UE that performs the method of FIG. 7 may comprise: a radio frequency (RF) module for transmitting and receiving a radio signal; and a processor functionally connected to the RF module.

In this case, the processor may receive, from a base station, information relating to a plurality of SRS resource sets, the SRS resource sets each comprising one or more SRS resources.

In addition, the processor may transmit, to the base station, an SRS on the plurality of SRS resources based on the information received from the base station.

In this case, if the plurality of SRS resources are included in difference SRS resource sets, the SRS may be transmitted simultaneously on the plurality of SRS resources.

If the plurality of SRS resources are included in different SRS resource sets, the SRS may be transmitted through frequency division multiplexing (FDM).

If the plurality of SRS resources are included in the same SRS resource set, the SRS may be transmitted through time division multiplexing (TDM).

Moreover, the method for the base station to receive the SRS may be as follows.

First of all, information relating to a plurality of SRS resource sets each comprising one or more SRS resources may be transmitted to the UE.

Next, the base station may receive an SRS from the UE.

In this case, if the one or more SRS resources are included in different SRS resource sets, the SRS transmitted by the UE may be transmitted simultaneously.

Devices in General to which the Present Disclosure May be Applied

FIG. 9 illustrates a block diagram of a wireless communication device to which methods proposed in the present disclosure may be applied.

Referring to FIG. 9, a wireless communication system comprises a base station 910 and a plurality of UEs 920 disposed within the area of the base station.

The base station and the UE may be represented as wireless devices.

The base station comprises a processor 911, a memory 912, and a radio frequency (RF) module 913. The processor 911 implements the functions, processes, and/or methods proposed in FIGS. 1 through 8. The layers of a radio interface protocol may be implemented by the processor. The memory is connected to the processor, and stores various information for driving the processor.

The RF module is connected to the processor, and transmits and/or receives a radio signal.

The UE comprises a processor 922, a memory 922, and an RF module 923.

The processor implements the functions, processes, and/or methods proposed in FIGS. 1 through 8. The layers of a radio interface protocol may be implemented by the processor. The memory is connected to the processor, and stores various information for driving the processor. The RF module is connected to the processor, and transmits and/or receives a radio signal.

The memory 912 and 922 may be positioned inside or outside the processor 911 and 921, and may be connected to the processor by various well-known means.

Moreover, the base station and/or UE may have a single antenna or multiple antennas.

The antenna 914 and 924 may function to transmit and receive a radio signal.

FIG. 10 illustrates a block diagram of a communication device according to an exemplary embodiment of the present disclosure.

Particularly, FIG. 10 is a diagram illustrating the UE of FIG. 9 in more detail.

Referring to FIG. 10, the UE may comprise a processor (or digital signal processor (DSP)) 1010, an RF module (or RF unit) 1035, a power management module 1005, an antenna 1040, a battery 1055, a display 1015, a keypad 1020, a memory 1030, a subscriber identification module (SIM) card 1025 (this element is optional), a speaker 1045, and a microphone 1050. The UE may further comprise a single antenna or multiple antennas.

The processor 1010 implements the functions, processes, and/or methods proposed in FIGS. 1 through 8. The layers of a radio interface protocol may be implemented by the processor.

The memory 1030 is connected to the processor, and stores information related to the operation of the processor. The memory may be positioned inside or outside the processor, and may be connected to the processor by various well-known means.

A user enters command information, such as a telephone number, for example, by pressing (or touching) a button of the keypad 1020 or through voice activation using the microphone 1050. The processor receives such command information, and processes it so that a proper function, such as making a phone call to the telephone number, is performed. Operational data may be extracted from the SIM card 1025 or the memory 1030. Furthermore, the processor may display command information or driving information on the display 1015 for user recognition or convenience.

The RF module 1035 is connected to the processor, and transmits and/or receives RF signals. The processor delivers command information to the RF module 1035 in order to initiate communication, for example, so that radio signals forming voice communication data are transmitted. The RF module 1035 comprises a receiver and a transmitter in order to receive and transmit radio signals. The antenna 1040 functions to transmit and receive radio signals. When a radio signal is received, the RF module delivers the radio signal to have it processed by the processor, and may convert the signal into a baseband. The processed signal may be converted into audible or readable information that is outputted through the speaker 1045.

FIG. 11 is a diagram illustrating an example of an RF module of a wireless communication device to which a method proposed in the present disclosure is applicable.

Specifically, FIG. 11 shows an example of an RF module that may be implemented in a Frequency Division Duplex (FDD) system.

First, in a transmission path, the processor described in FIGS. 9 and 10 processes data to be transmitted and provides an analog output signal to a transmitter 1110.

Within the transmitter 1110, the analog output signal is filtered by a low pass filter (LPF) 1111 to remove undesired images caused by digital-to-analog conversion (ADC), up-converted from baseband to RF by an up-converter (mixer) 1112, and amplified by a variable gain amplifier (VGA) 1113. The amplified signal is filtered by a filter 1114, further amplified by a power amplifier (PA) 1115, routed through duplexer(s) 1150/antenna switch(es) 1160, and transmitted via an antenna 1170.

In addition, in a reception path, the antenna receives signals from the outside and provides the received signals, which are routed through antenna switch(es) 1160/ duplexer(s) 1150 and provided to the receiver 1120.

Within the receiver 1120, the received signal is amplified by a low noise amplifier (LNA) 1123, filtered by a band pass filter 1124, and down-converted from RF to baseband by a down-converter (mixer) 1125.

The down-converted signal is filtered by a low pass filter (LPF) 1126, and amplified by a VGA 1127 to obtain an analog input signal, which is provided to the processor described in FIG. 9 and FIG. 10.

Further, a local oscillator (LO) generator 1140 generates and transmitted and receive LO signals and provides them to the up-converter 1112 and down-converter 1125, respectively.

In addition, a phase locked loop (PLL) 1130 may receive control information from the processor and provide the control signals to the LO generator 1140, in order to generate the transmitted and received LO signals at appropriate frequencies.

Figure 12:
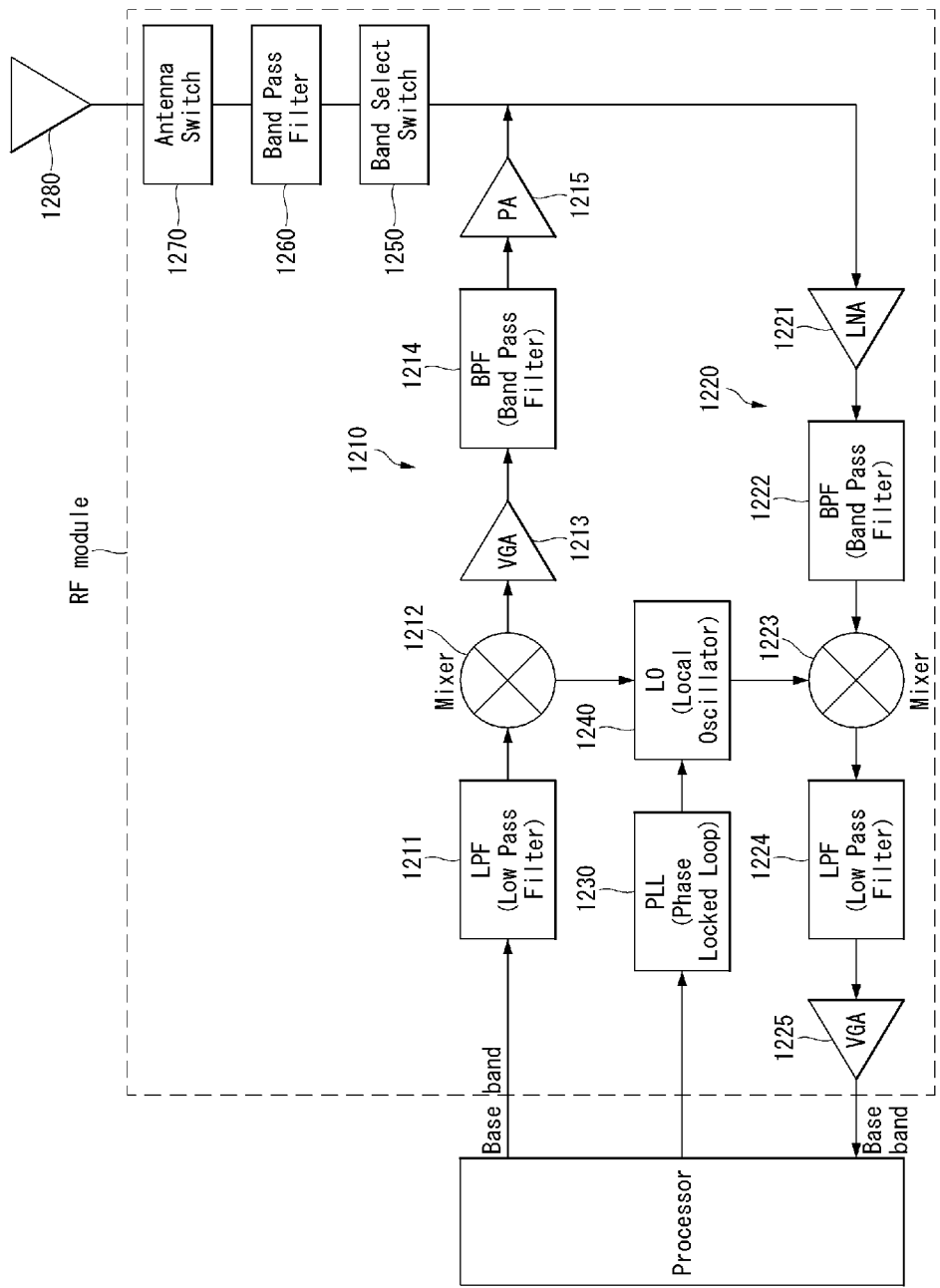
FIG. 12 illustrates another example of a RF module of a wireless communication device to which a method proposed by the present disclosure may be applied.

The circuits illustrated in FIG. 12 may be arranged differently from the configuration illustrated in FIG. 12.

FIG. 12 illustrates another example of a RF module of a wireless communication device to which a method proposed by the present disclosure may be applied.

Specifically, FIG. 12 illustrates an example of an RF module that can be implemented in a time division duplex (TDD) system.

The transmitter 1210 and receiver 1220 of the RF module in the TDD system have the same structure as the transmitter and the receiver of the RF module in the FDD system.

Hereinafter, only the differences in structure between the RF module of the TDD system and the RF module of the FDD system will be described, and, for the same elements in their structure, refer to the description of FIG. 11.

A signal amplified by a power amplifier (PA) 1215 of the transmitter is routed through a band select switch 1250, a band pass filter (BPF) 1260, and antenna switch(es) 1270 and is transmitted via an antenna 1280.

Further, in a reception path, the antenna receives signals from the outside and provides the received signals, which are routed through the antenna switch(es) 1270, the band pass filter 1260, and the band select switch 1250 and provided to the receiver 1220

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

A method for transmitting a sounding reference signal (SRS) in a wireless communication system according to the present disclosure has been described with respect to an example applied to a 3GPP LTE/LTE-A system or 5G system (New RAT system), it is also applicable to various wireless communication systems.

The invention claimed is:

1. A method for receiving, by a base station, a sounding reference signal (SRS) in a wireless communication system, the method comprising:
   receiving, from a terminal, capability information including a maximum number of SRS resources per each SRS resource set supported by the terminal;
   transmitting, to the terminal, configuration information including 1) information related to a first SRS resource set and a second SRS resource set, each of the first SRS resource set and the second SRS resource set comprising one or more SRS resources based on the capability information and 2) a phase-tracking reference signal (PT-RS) port index information for one or more SRS resources;
   transmitting, to the terminal, downlink control information (DCI) including information related to a plurality of SRS resource indicators and information related to a plurality of precoding information and number of layers; and
   receiving, from the base station, the SRS on at least one SRS resource based on the configuration information and the DCI,
   wherein based on the at least one SRS resource being included in different SRS resource sets, the SRS is received in a same time unit on the at least one SRS resource in each of the different SRS resource sets,
   wherein the plurality of SRS resource indicators include a first SRS resource indicator indicating at least one SRS specific resource among the one or more SRS resources included in the first SRS resource set and a second SRS resource indicator indicating at least one specific SRS resource among the one or more SRS resources included in the second SRS resource set,
   wherein the plurality of precoding information and number of layers include a first precoding information and number of layers corresponding to the first SRS resource indicator and the second precoding information and number of layers corresponding to the second SRS resource indicator, and wherein, based on the at least one SRS resource being associated with a specific PT-RS port index, dedicated demodulation reference signal (DM-RS) ports are associated to the specific PT-RS port index.

2. A base station configured to transmit a sounding reference signal (SRS) in a wireless communication system, the base station comprising:

a transmitter and a receiver; and a processor functionally connected to the transmitter and receiver, wherein the processor is configured to:

receive, from a terminal, capability information including a maximum number of SRS resources per each SRS resource set supported by the terminal;

transmit, to the terminal, configuration information including 1) information related to a first SRS resource set and a second SRS resource set, each of the first SRS resource set and the second SRS resource set comprising one or more SRS resources based on the capability information and 2) a phase-tracking reference signal (PT-RS) port index information for one or more SRS resources;

transmit, to the terminal, downlink control information (DCI) including information related to a plurality of SRS resource indicators and information related to a plurality of precoding information and number of layers; and receive, from the terminal, the SRS on at least one SRS resource based on the configuration information and the DCI, wherein based on the at least one SRS resource being included in different SRS resource sets, the SRS is received in a same time unit on the at least one SRS resource in each of the different SRS resource sets, wherein the plurality of SRS resource indicators include a first SRS resource indicator indicating at least one specific SRS resource among the one or more SRS resources included in the first SRS resource set and a second SRS resource indicator indicating at least one specific SRS resource among the one or more SRS resources included in the second SRS resource set, wherein the plurality of precoding information and number of layers include a first precoding information and number of layers corresponding to the first SRS resource indicator and the second precoding information and number of layers corresponding to the second SRS resource indicator, and wherein, based on the at least one SRS resource being associated with a specific PT-RS port index, dedicated demodulation reference signal (DM-RS) ports are associated to the specific PT-RS port index.

3. A method for transmitting, by a terminal, a sounding reference signal (SRS) in a wireless communication system, the method comprising:

transmitting, to a base station, capability information including a maximum number of SRS resources per each SRS resource set supported by the terminal;

receiving, from the base station, configuration information including 1) information related to a plurality of resource sets, each of the plurality of SRS resource sets comprising one or more SRS resources based on the capability information and 2) a phase-tracking reference signal (PT-RS) port index information for one or more SRS resources;

receiving, from the base station, downlink control information (DCI) including information related to a plurality of SRS resource indicators and information related to a plurality of precoding information and number of layers; and transmitting, to the base station, the SRS in a same time unit on at least one SRS resource included in different SRS resource sets, based on the configuration information, wherein each of the plurality of SRS resource indicators corresponds to the each of the plurality of SRS resource sets, and wherein each of the plurality of precoding information and number of layers corresponds to the each of the plurality of the SRS resource indicators.

4. The method of claim 3, wherein the plurality of SRS resource indicators include a first SRS resource indicator indicating at least one specific SRS resource among the one or more SRS resources included in the first SRS resource set and a second SRS resource indicator indicating at least one specific SRS resource among the one or more SRS resources included in the second SRS resource set.

5. The method of claim 3, wherein the plurality of precoding information and number of layers include a first precoding information and number of layers corresponding to the first SRS resource indicator and the second precoding information and number of layers corresponding to the second SRS resource indicator.

6. The method of claim 3, wherein, based on the at least one SRS resource being associated with a specific PT-RS port index, dedicated demodulation reference signal (DM-RS) ports are associated to the specific PT-RS port index.

7. A terminal configured to transmit a sounding reference signal (SRS) in a wireless communication system, the terminal comprising:

a transmitter and a receiver; and a processor functionally connected to the transmitter and receiver, wherein the processor is configured to:

transmit, to a base station, capability information including a maximum number of SRS resources per each SRS resource set supported by the terminal;

receive, from the base station, configuration information including 1) information related to a plurality of resource sets, each of the plurality of SRS resource sets comprising one or more SRS resources based on the capability information and 2) a phase-tracking reference signal (PT-RS) port index information for one or more SRS resources;

receive, from the base station, downlink control information (DCI) including information related to a plurality of SRS resource indicators and information related to a plurality of precoding information and number of layers; and transmit, to the base station, the SRS in a same time unit on at least one SRS resource included in different SRS resource sets, based on the configuration information, wherein each of the plurality of SRS resource indicators corresponds to the each of the plurality of SRS resource sets, and wherein each of the plurality of precoding information and number of layers corresponds to the each of the plurality of the SRS resource indicators.

8. The terminal of claim 7, wherein the plurality of SRS resource indicators include a first SRS resource indicator indicating at least one specific SRS resource among the one or more SRS resources included in the first SRS resource set and a second SRS resource indicator indicating at least one specific SRS resource among the one or more SRS resources included in the second SRS resource set.

9. The terminal of claim 7, wherein the plurality of precoding information and number of layers include a first precoding information and number of layers corresponding to the first SRS resource indicator and the second precoding information and number of layers corresponding to the second SRS resource indicator.

10. The terminal of claim 7, wherein, based on the at least one SRS resource being associated with a specific PT-RS port index, dedicated demodulation reference signal (DM-RS) ports are associated to the specific PT-RS port index.

* * * * *